March 21, 1939.  W. E. LOONEY  2,151,128
AIRPLANE
Filed Jan. 8, 1937  3 Sheets-Sheet 1
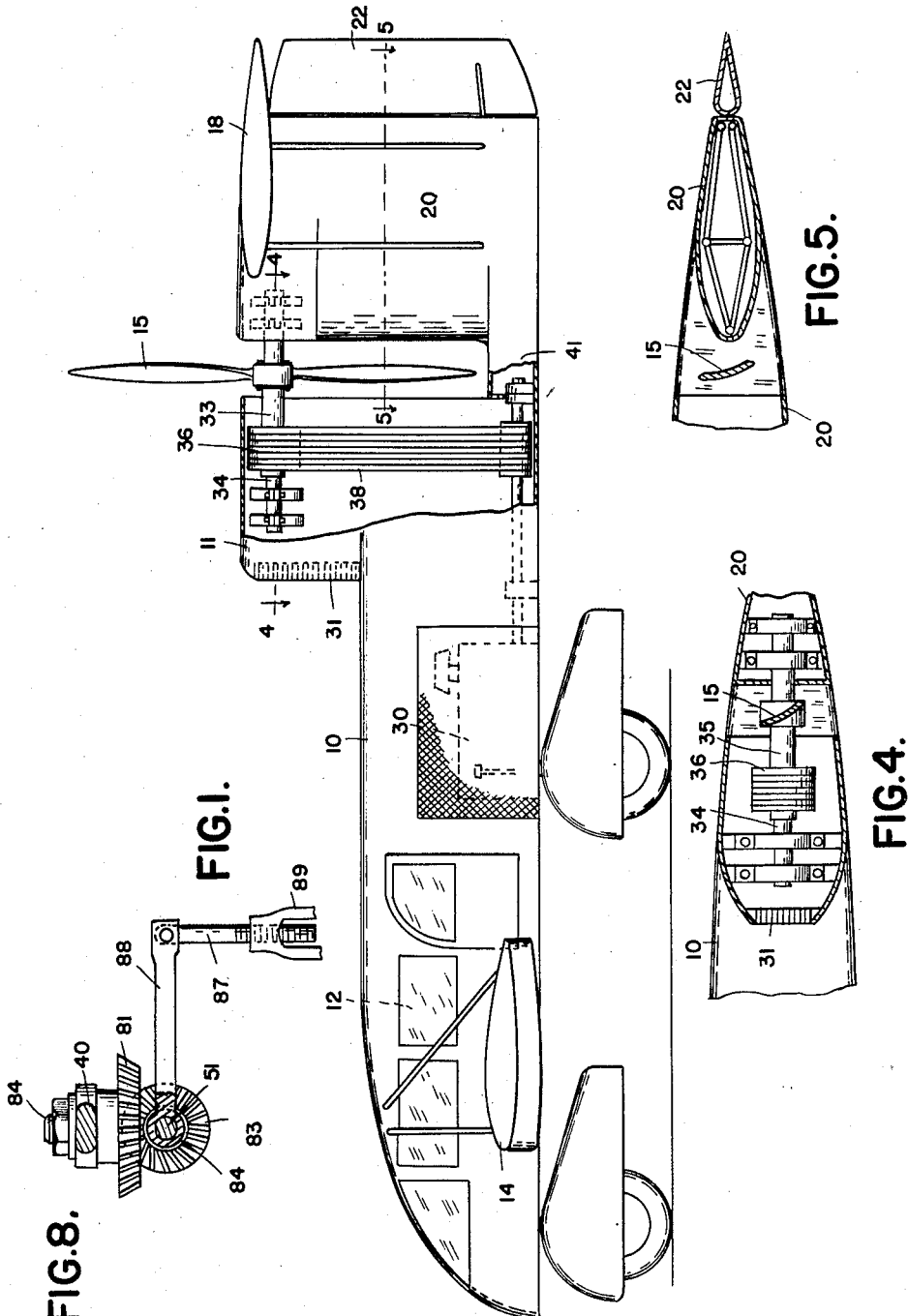
INVENTOR.
WILLIAM E. LOONEY
BY
ATTORNEYS March 21, 1939. W. E. LOONEY 2,151,128
AIRPLANE
Filed Jan. 8, 1937 3 Sheets-Sheet 2

INVENTOR.
WILLIAM E. LOONEY
BY
ATTORNEYS

March 21, 1939.   W. E. LOONEY   2,151,128
AIRPLANE
Filed Jan. 8, 1937   3 Sheets-Sheet 3
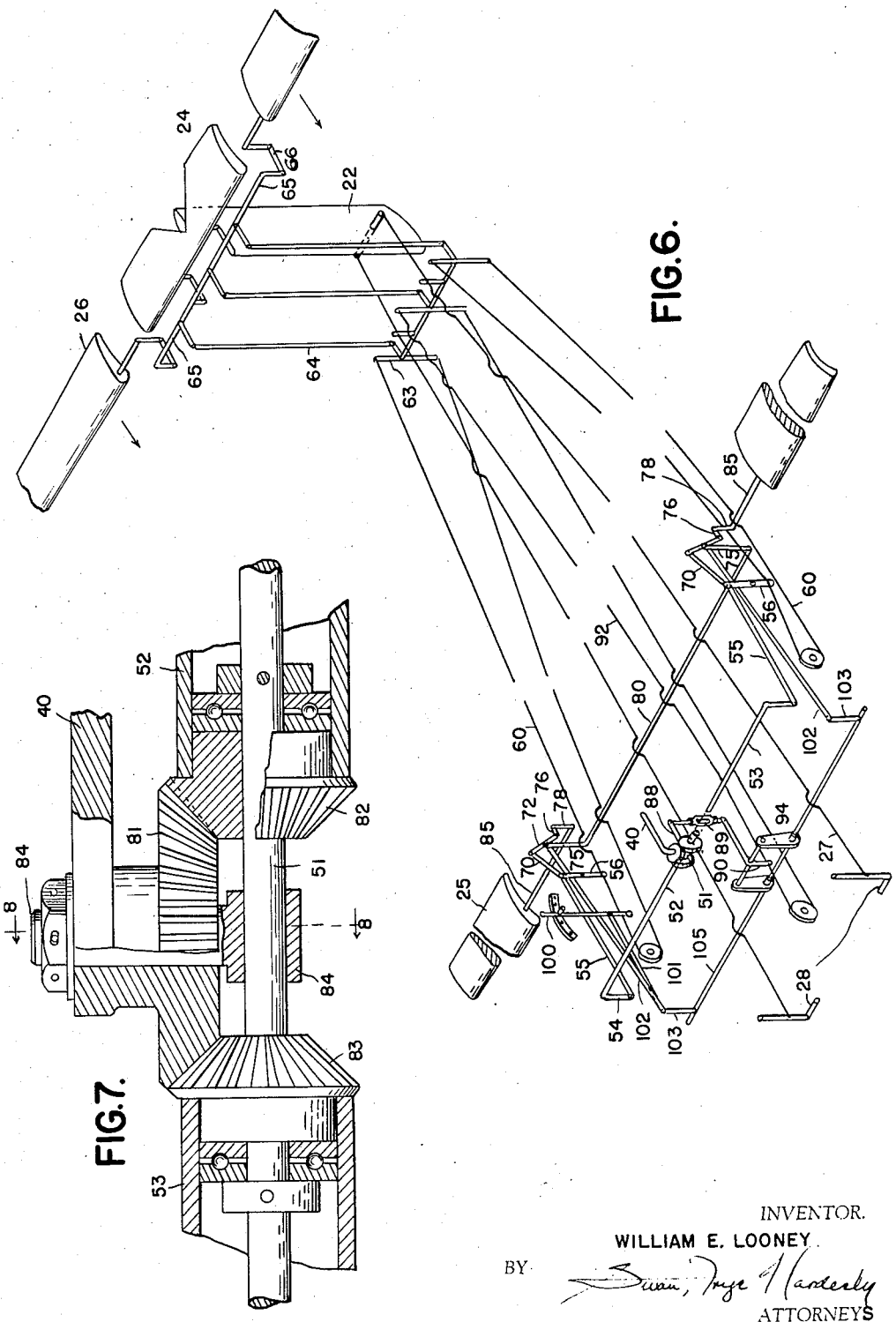
INVENTOR.
WILLIAM E. LOONEY.
BY
ATTORNEYS Patented Mar. 21, 1939

2,151,128

UNITED STATES PATENT OFFICE 2,151,128

AIRPLANE

William E. Looney, Detroit, Mich.

Application January 8, 1937, Serial No. 119,565

2 Claims. (Cl. 244—45)

This invention relates to fixed-wing airplanes, and to improvements of the controlling means, the disposition of the wings, power plant and propelling means therefor, as well as improvement of the fuselage construction.

An important object of the invention is to provide novel controlling means, including elements arranged and capable of functioning similarly to ailerons, but adapted to act also as wing flaps for braking the air speed, and as wing lift adjusting means, making for greater controllability both in the air and during landing and taking off, as well as so increasing maneuverability as to add to the usefulness of the ship and its safety under emergency conditions; such maneuverability being secured not only without sacrifice of stability, but with an actual substantial increase thereof.

A further object is to provide an airplane combining the advantageous features of both the high wing and low wing types of monoplanes, with the disadvantages of neither, incorporating two wings at different levels with relation to the fuselage yet eliminating many of the disadvantages of the conventional biplane, and so arranged that not only do both wings function at full efficiency, but that such wings, in addition to their stabilizing influence when the ship is in the air, aid greatly in maintaining an even keel when the ship is close to the ground, yet actually increase maneuverability, due to their adaptability, above alluded to, to variable lift control.

Another object is to provide an airplane of the character indicated in which the propeller is so disposed with relation to one wing and to certain of the controlling elements that additional maneuverability is obtainable by sudden changes of engine speed, while with more uniform propeller speeds the wing in question acts as a stabilizer.

A further object of the invention comprises a novel and improved mounting of the propeller with relation to the fuselage and wings, in such manner as to travel through a slot in a narrow portion of the fuselage, without thereby reducing materially if at all the efficiency of the propeller, or harmfully varying the loading of the blades during their rotation. An object related to that last outlined comprises the structural arrangement of the fuselage, and of the engine and its cooling means or portions, in such fashion that air moved by the propeller in that portion of its swept area which lies within the slot, is drawn through the sides of the ship and through a portion of the fuselage structure, over the engine and cooling means, thereby benefiting both engine cooling and propeller efficiency.

An additional object resides in the embodiment of new principles of distribution of weight and lifting surface, resulting in a relationship between these factors possessing greater inherent stability, quite aside from the aforementioned improvement of the active control elements.

In the drawings:

Figure 1 is a side elevational view of an airplane incorporating the principles of this invention.

Figure 3:
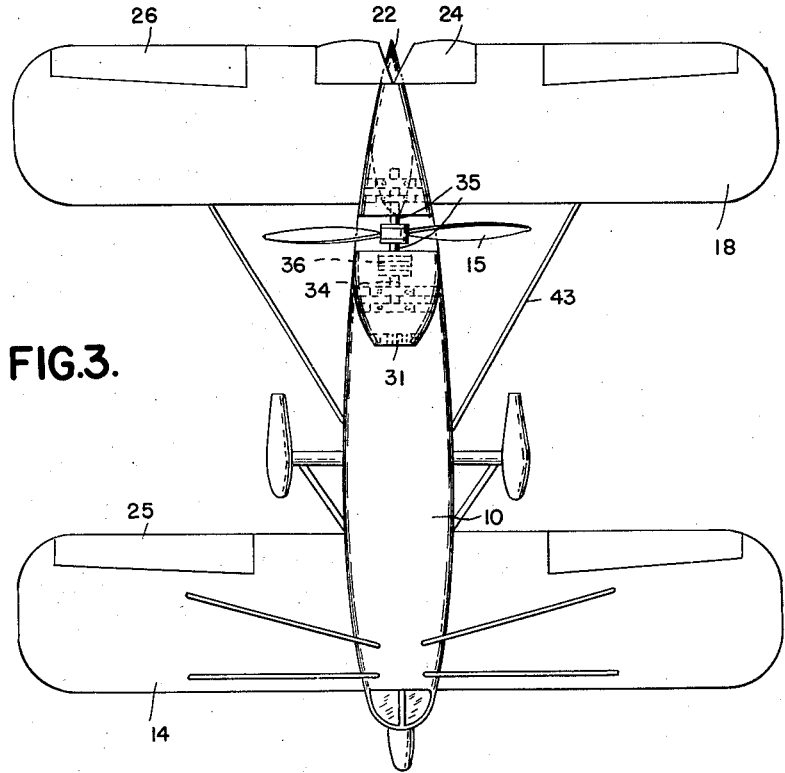
Figure 3 is a top plan view thereof.

Figures 4 and 5 are horizontal sectional views taken substantially on the lines 4—4 and 5—5 respectively of Figure 1.

Figure 6 is a diagrammatic perspective view of the control system for the ailerons, elevator and rudder.

Figure 7 is a vertical section showing the joystick mounting and connecting means, taken diametrically through the stick-supporting shaft.

Figure 8 is a detailed section taken at right angles to Figure 7, substantially on the plane indicated at 8—8 of Figure 7.

Referring now to the drawings, reference character 10 designates the fuselage, the details of mechanical construction of the framework of which, since they may be of any usual or desired variety, are not shown. The cabin 12, for pilot and load, is located forward, the pilot sitting in the nose and having a clear view forward and in all directions, the cabin projecting slightly ahead of the low front wing 14.

The ship is of the pusher type, the propeller 15, however, being located forward of the high aft wing 18 and of the empennage section 20 which carries it. Such empennage section, although appearing from the side as a continuation of the fuselage, is thinned and of streamlined section in its area below the hub of the propeller and the back wing. The rudder 22 is arranged at the rear of the empennage and may be operable in the conventional manner through cable 27 connected to foot pedals 28. The elevator 24 is built into the back wing, such wing taking the place of the usual tail stabilizer. The elevator may be of very small size, in view of the arrangement of the propeller and the subsequently to described functioning of the ailerons 25, 26.

The propeller is mounted high in the fuselage, with its hub approximately in the plane of the aft wing 18, and is belt driven from the engine 30 mounted approximately amidships and low in the fuselage. The engine may be of any desired or suitable variety, that shown being of the water cooled type, with its radiator 31 located at the front of the upwardly projecting rear portion 11 of the fuselage. The portion 11 of the fuselage carries the propeller shaft 34, and constitutes a forward extension of the top of the empennage section 20.

Figure 2:
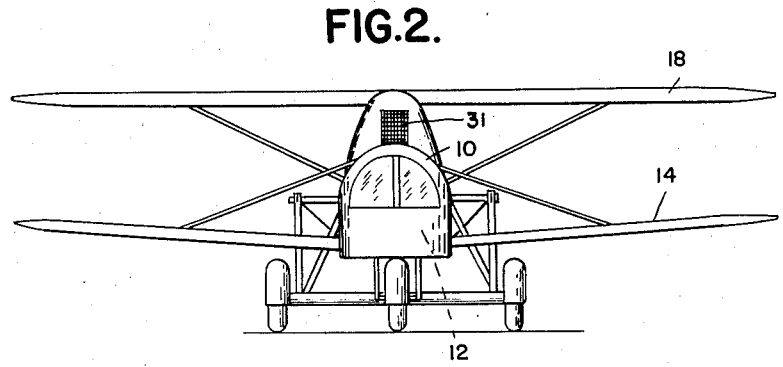
Figure 2 is a front elevational view of the same.

As best shown in Figure 4, the propeller shaft 34 is rigidly fixed in both the fuselage and the empennage section, and may constitute an important part of the structural means for holding the empennage section. The propeller is mounted upon a sleeve 35 rotatably carried by the shaft, which sleeve also carries the pulley 36 drivable by belts 38 from the engine. Below the area swept by the propeller a structural section 41 may unite the empennage section to the fuselage, and guys as 43 may also be employed extending from the rear wings forward to the fuselage. The front wing is preferably given a substantial dihedral, as best shown in Figure 2.

The controlling means is so arranged that the ailerons are actuated both with lateral and front and rear movement of the joystick 40, lateral movement of the stick throwing the ailerons down on one side of the ship and up on the other, to control lateral stability in the conventional manner, while with fore-and-aft movement of the stick, not only is the elevator 24 moved up and down in the usual way, but all four ailerons move with the elevator, but in the opposite direction, the resultant action being that when the ship is nosed up by the elevator, the camber and so the lift of the wings is simultaneously increased. Means are also provided for independently operating the front ailerons, whereby they may be thrown downwardly together to act as wing flaps or increase the lift of the front wings, or they may be moved upwardly to decrease the lift of the front wings, as desired.

The controlling action is transmitted to the rear of the ship through cables, while the front ailerons are link actuated.

The joystick is carried by a cross shaft 51, fixed in the fuselage and rotatably supporting tubular shafts 52—53 extending from the central location of the joystick to the sides of the ship, where through a crank, as 54, each hollow shaft is connected to a rearwardly extending link 55 articulated to the top of a lever 56. Levers 56 are centrally pivoted upon fixed axes, and at their lower ends connected to cables 60 by which the rear ailerons are actuated, the motion being conveyed from rocking spreaders 63 at the rear ends of the cables upwardly to the ailerons by more or less conventional linkage including levers (undesignated) integral with spreaders 63, connected by vertical links 64 to the aileron actuating shafts 65 in the back wing, such shafts being shown as connected to the ailerons by additional linkage 66.

Links 70, also articulated to the tops of levers 56, carry the motion of the links rearwardly to the forward ailerons 25, to which they are articulated through double-armed levers as 72 centrally pivoted to the tops of levers 75, levers 72 being connected by means of links 76 to cranks 78 mounted upon the inner ends of the aileron shafts 85. Levers 75 are carried at opposite ends of a cross shaft 80 mounted in the fuselage, and are ordinarily fixed in position, so that double armed levers 72, through which motion is transmitted to the front ailerons, may rock upon fixed pivots carried at the tops of levers 75.

As best shown in Figures 7 and 8, the joystick is connected to a miter gear 81, through which the tubular main shafts 52—53 for operating the ailerons are actuated. Gear 81 meshes with miter gears 82—83, carried at the inner ends of tubular shafts 52—53 respectively, gear 81 being journaled upon a stub shaft 84 freely swingable about the axis of the supporting shaft 51, the stub shaft holding the joystick and gear against movement away from the shaft. When the stick is rocked in a plane transverse to shaft 51, that is, in a vertical plane fore and aft of the ship, shafts 52—53 are turned in the same direction, and consequently the ailerons on both sides of the ship are moved in like directions, the hook-up being such, as will be readily recognized, that all ailerons are then moved up, or all are moved down, together. When the stick is rocked in a plane parallel to the shaft (across the ship), main shafts 52 and 53 are turned in opposite directions, the result being to move one of the main links 55 forward and the other aft, throwing the ailerons actuated by the link moved forward downwardly, and those upon the other side of the ship upwardly. Also connected to the joystick and responsive only to its movement in the fore and aft plane is a lever 88, shown carried by the stub shaft and articulated as through a link 87 and bellcrank 90 to the elevator cable 92, the linkage being such, as shown in Figure 6, that forward movement of the stick throws the elevator downward, and rearward movement pulls it up, also in the conventional manner. The bellcrank 90 during this movement, swings with respect to its supporting lever arms 94, which are then fixed in position, being carried by shaft 105, which shaft is rocked only by hand lever 100. Incorporated in link 87 is a turnbuckle 89 by which the initial setting of the elevator may be adjusted by the pilot to compensate for load or other conditions.

Levers 75 are actuable by a separate hand lever as 100, connected thereto as by links 101—102, the hand lever being arranged at the side of the cockpit or pilot's cabin. Link 101 extends from the hand lever to a crank 103, one of which is carried at each end of a transverse rock shaft 105, while links 102 extend from the cranks, which are fixed upon opposite ends of the shaft, to the tops of levers 75. If the joystick be unmoved, the rear ailerons are unaffected by movement of hand lever 100, lever 56 remaining fixed, while levers 72 are rocked about their axes of connection to links 70, to rock the front aileron shafts. It will be apparent that by movement of lever 100, both front ailerons may be thrown either upward or downward. At the same time, shaft 105 is rocked, through levers 103, swinging arms 94 and so moving bellcrank 90 bodily to the front or rear. Rotation of the bellcrank at such time is prevented by its linkage to arm 88, and cable 92 is accordingly moved with the levers to move the elevator 24 in a direction opposite to that in which front ailerons 25 are moved. Thus if in emergency conditions, a very quick or positive rocking of the ship up or down about its beam is desired, use of lever 100 enables actuation of the elevator to nose the ship upwardly, for example, while at the same time the lift of the front wings is increased, by downward movement of both front ailerons. Conversely, if sharp dropping of the nose is required, opposite movement of the lever 100 drops the elevator and at the same time, by raising both front ailerons, reduces the lift of the front wing, increasing the tendency of the ship to nose down.

On the other hand it will be seen that when the joystick 40 is moved in the longitudinal plane, in a direction to cause the ship to dive, for example, all four ailerons are thrown upward, tending to assist the descent by decreasing the lift of the wings, without, however, affecting the action of the elevator insofar as its effect upon the angularity of the ship is concerned. Conversely, when the stick is pulled to nose the plane upward, all four ailerons are thrown down, and the rocking effect of the simultaneously moved elevator remains unaffected. Operation of both the front and back ailerons for lateral stability occurs in the conventional manner when the stick is moved from side to side, and the rudder action is also conventional, so that despite the greater responsiveness of the ship and the important emergency increase of flexibility provided by hand lever 100, operation of the controls does not have to be especially learned or studied by a trained pilot.

Due to the location of the rear ailerons, elevator and rudder directly in the slip stream of the propeller, as well as the tendency of the ailerons to augment the effect of the elevator, a smaller rudder and elevator in proportion to the size of the ship may be employed, and the use of four ailerons also allows their formation of smaller size, the braking effect of all of these elements being thus reduced. The location of the rear wing also allows momentary increase or decrease of the lift upon the rear of the ship by speeding up or throttling down the engine. This is of particular advantage in taking off, when it is frequently desired to get the tail of the plane up and flattened out; while in flying boats, amphibians and the like, to which the invention will be seen to be readily applicable, lifting the tail is frequently most important and difficult, so that an opportunity to increase momentarily the lift of the tail, simply by sharply speeding up the engine, will enable quicker ascent due to the more powerful effort with which the rear of the ship may be made to break from the water.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In an airplane construction, a fuselage, wings carried by the fuselage in substantial tandem arrangement, one near the front and the other near the rear of the fuselage, the rear wing being higher than the front wing, ailerons carried by each of said wings upon opposite sides of the fuselage, means for operating the ailerons of one of said wings independently of those of the other, and means for operating said ailerons of at least one wing either up on one side and down on the other side of the fuselage, or both in the same direction.

2. In an airplane, a fuselage, a pair of wings carried by the fuselage in substantial tandem arrangement, ailerons appurtenant each wing and on opposite sides of the fuselage, operating means for the ailerons comprising means connecting the same for simultaneous and parallel movement, said connecting means having separately movable portions for moving the ailerons upon opposite sides of the fuselage in opposite directions, and independent means for moving the ailerons of one wing without affecting those of the other.

WILLIAM E. LOONEY.